United States Patent
Butani et al.

(10) Patent No.: US 12,517,069 B2
(45) Date of Patent: Jan. 6, 2026

(54) SYSTEM AND METHOD FOR OPTIMIZED SAMPLE IRRADIATION IN A CABINET IRRADIATOR

(71) Applicant: KUB TECHNOLOGIES, INC., Stratford, CT (US)

(72) Inventors: Vikram Butani, Fairfield, CT (US); Chester Lowe, Palm Springs, CA (US); Hrituja Babar, Fairfield, CT (US); Jhonah Felipe, Stratford, CT (US); Aditya Ghume, Stratford, CT (US); Mustafa Merchant, Stratford, CT (US); Karla Palma, Stratford, CT (US); Vivek Raut, Stratford, CT (US); Arpit Soni, Fairfield, CT (US); Reshma Sunny, Fairfield, CT (US); Jeet Trivedi, Fairfield, CT (US); Deeksha Khanna, Stratford, CT (US)

(73) Assignee: KUB TECHNOLOGIES, INC., Stratford, CT (US)

( * ) Notice: Subject to any disclaimer, the term of this patent is extended or adjusted under 35 U.S.C. 154(b) by 88 days.

(21) Appl. No.: 18/534,589

(22) Filed: Dec. 9, 2023

(65) Prior Publication Data

US 2024/0353356 A1    Oct. 24, 2024

Related U.S. Application Data

(60) Provisional application No. 63/460,589, filed on Apr. 19, 2023.

(51) Int. Cl.
G01N 23/22    (2018.01)
G01N 23/20    (2018.01)
(Continued)

(52) U.S. Cl.
CPC ..... G01N 23/20025 (2013.01); G01N 23/223 (2013.01); G06T 7/70 (2017.01); *G06T 2207/10116* (2013.01)

(58) Field of Classification Search
CPC .. G01N 23/20025; G01N 23/223; G06T 7/70; G06T 2207/10116
See application file for complete search history.

(56) References Cited

U.S. PATENT DOCUMENTS 12,293,851 B2 *  5/2025  LaViola .................... A61L 2/26
2010/0046700 A1  2/2010  Sakai et al.
(Continued)

FOREIGN PATENT DOCUMENTS

JP    H11162809 A    6/1999
WO    WO-2022140868 A1 *  7/2022 ............. G01N 33/24

OTHER PUBLICATIONS

United States Patent and Trademark Office, International Search Report, Application No. PCT/US2024/059207, mailed Feb. 21, 2025, 2 pages.
(Continued)

*Primary Examiner* — Mark R Gaworecki
(74) *Attorney, Agent, or Firm* — Ziegler IP Law Group

(57) ABSTRACT

A cabinet irradiator incorporates an x-ray tube, a moveable sample stage, dosimeter, and a real-time camera. A computing device receives video data from the real-time camera and based on the video data the computing device manipulates the sample stage height vertically in relationship to the sample chamber floor and the output window of the x-ray tube to be able to deliver the maximum dose rate to the entire sample as quickly as possible. A real-time image is captured and the image is correlated to move the sample stage vertically attaining a closer proximity to the exit window of the x-ray tube to attain and maximize dosage received by the (Continued)

sample in the shortest duration of time and operating the system to attain the desired prescribed dose.

11 Claims, 5 Drawing Sheets

(51) Int. Cl.
  *G01N 23/20025* (2018.01)
  *G01N 23/223* (2006.01)
  *G06T 7/70* (2017.01)

(56) References Cited

U.S. PATENT DOCUMENTS

| | | | |
|---|---|---|---|
| 2011/0051894 A1* | 3/2011 | Takahara | G01N 23/223 |
| | | | 378/86 |
| 2014/0014848 A1* | 1/2014 | Hatakeyama | H01J 37/29 |
| | | | 378/62 |
| 2018/0275076 A1* | 9/2018 | Butani | A61B 6/4208 |
| 2019/0053771 A1* | 2/2019 | Butani | A61B 6/502 |
| 2019/0187073 A1* | 6/2019 | Butani | A61B 6/508 |
| 2023/0011644 A1 | 1/2023 | Zhao | |
| 2024/0353356 A1 | 10/2024 | Butani et al. | |

OTHER PUBLICATIONS

United States Patent and Trademark Office, Written Opinion of the International Searching Authority, Application No. PCT/US2024/059207, mailed Feb. 21, 2025, 11 pages.

\* cited by examiner

SYSTEM AND METHOD FOR OPTIMIZED SAMPLE IRRADIATION IN A CABINET IRRADIATOR
DIAGRAMS

Typical Example of a Cabinet Irradiator System

Camera

SYSTEM AND METHOD FOR OPTIMIZED SAMPLE IRRADIATION IN A CABINET IRRADIATOR

CROSS-REFERENCE TO RELATED APPLICATIONS

This application is related to the following applications filed on 9 Dec. 2023, the disclosures of which are each, individually, incorporated herein by reference in their entireties: U.S. Ser. No. 18/534,584; U.S. Ser. No. 18/534,586; U.S. Ser. No. 18/534,587; Ser. No. 18/534,588; Ser. No. 18/534,590; Ser. No. 18/534,591 and Ser. No. 18/534,592.

BACKGROUND

Field

The aspects of the disclosed embodiments relate to the field of a cabinet irradiator. In particular, the aspects of the disclosed embodiments relate to a system and method for capturing a real-time image and then correlating with that image to move the sample stage vertically attaining a closer proximity to the exit window of the x-ray tube to attain and maximize dosage received by the sample in the shortest duration of time and operating the system to attain the desired prescribed dose. Attaining the above as described would homogenize and optimize the dose received by the sample.

Background

Irradiation is the process by which an object is exposed to radiation. An irradiator is a device used to expose an object to radiation for a variety of purposes. Irradiators may be used for sterilizing medical and pharmaceutical supplies, preserving foodstuffs, alteration of gemstone colors, studying radiation effects, eradicating insects through sterile male release programs, or calibrating thermoluminescent dosimeters (TLDs).

The exposure can originate from various sources, including natural sources. Most frequently the term refers to ionizing radiation, and to a level of radiation that will serve a specific purpose, rather than radiation exposure to normal levels of background radiation. The term irradiation usually excludes the exposure to non-ionizing radiation, such as infrared, visible light, microwaves from cellular phones or electromagnetic waves emitted by radio and television receivers and power supplies.

In this case the radiation originates by an x-ray source. A little background of physics is that the closer that the sample is to the exit window of the x-ray source the higher rate of exposure per the inverse-square law.

In science, an inverse-square law is any scientific law stating that a specified physical quantity is inversely proportional to the square of the distance from the source of that physical quantity. The fundamental cause for this can be understood as geometric dilution corresponding to point-source radiation into three-dimensional space and as such in the laws of radiation, the closer you are from the emitting source the higher the dose.

It would be advantageous to a researcher or operator to be able to ensure full coverage of a sample while also maximizing the dose rate received automatically and as such with a unit incorporating a real-time camera attached to the computer which can utilize the resultant image to expeditiously visualize the sample, command a sample table to move vertically closer to the x-ray tube while ensuring full coverage, and then utilizing a calibrated look-up table calculate the proper technique in time to deliver the prescribed dose to the sample.

While cameras incorporated into x-ray cabinets have been around, the particular feature differentiating this invention from previous public domain features is the differentiating factor of the manipulation of the sample tray to ensure full coverage and maximize the dose rate received.

Currently it is believed that there is not a system or method incorporating a real-time camera, moveable stage, and a computer to calculate the data received from the real-time camera to optimize dose rate in a cabinet irradiator system.

SUMMARY

In general, the aspects of the disclosed embodiments enable a device (cabinet irradiator system) utilizing a computer to capture a real-time image of the sample being irradiated and a moveable sample stage to provide ionizing radiation at the maximum dose rate possible while ensuring full coverage.

The cabinet irradiator can include an x-ray tube, a moveable sample stage, dosimeter, and a real-time camera. The computing device receives video data from the real-time camera and based on the video data the computing device manipulates the sample stage height vertically in relationship to the sample chamber floor and the output window of the x-ray tube to be able to deliver the maximum dose rate to the entire sample as quickly as possible.

In particular, the aspects of the disclosed embodiments relate to a system and method for capturing a real-time image and then correlating with that image to move the sample stage vertically attaining a closer proximity to the exit window of the x-ray tube to attain and maximize dosage received by the sample in the shortest duration of time and operating the system to attain the desired prescribed dose A cabinet irradiator utilizing an x-ray source is considered the safest replacement for cesium irradiators with a non-radio isotopic alternative (x-ray) while permanently reducing security risks A preferred embodiment system would incorporate a camera in a cabinet irradiator unit which captures an image of the sample on the sample tray/stage. It then compares the resultant image to the calibrated maximum coverage area for the emitted x-ray beam and moves the sample stage vertically closer to the x-ray source to ensure maximum coverage and dose rate that is available. The resultant dose rate will be extrapolated to the prescribed total dose that the operator has input and utilizing a calibrated look-up table, will command the system to provide ionizing radiation for a calculated length of time to ensure proper dose received.

The embodiment as related above explains how this invention would relate to a cabinet irradiator that may utilized for a plethora of modalities for cabinet irradiation whether they be organic and non-organic,

BRIEF DESCRIPTION OF THE DRAWINGS

To further clarify the above and other advantages and features of the aspects of the disclosed embodiments, a more particular description of the invention will be rendered by reference to specific embodiments thereof that are illustrated in the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION

Figure 1:
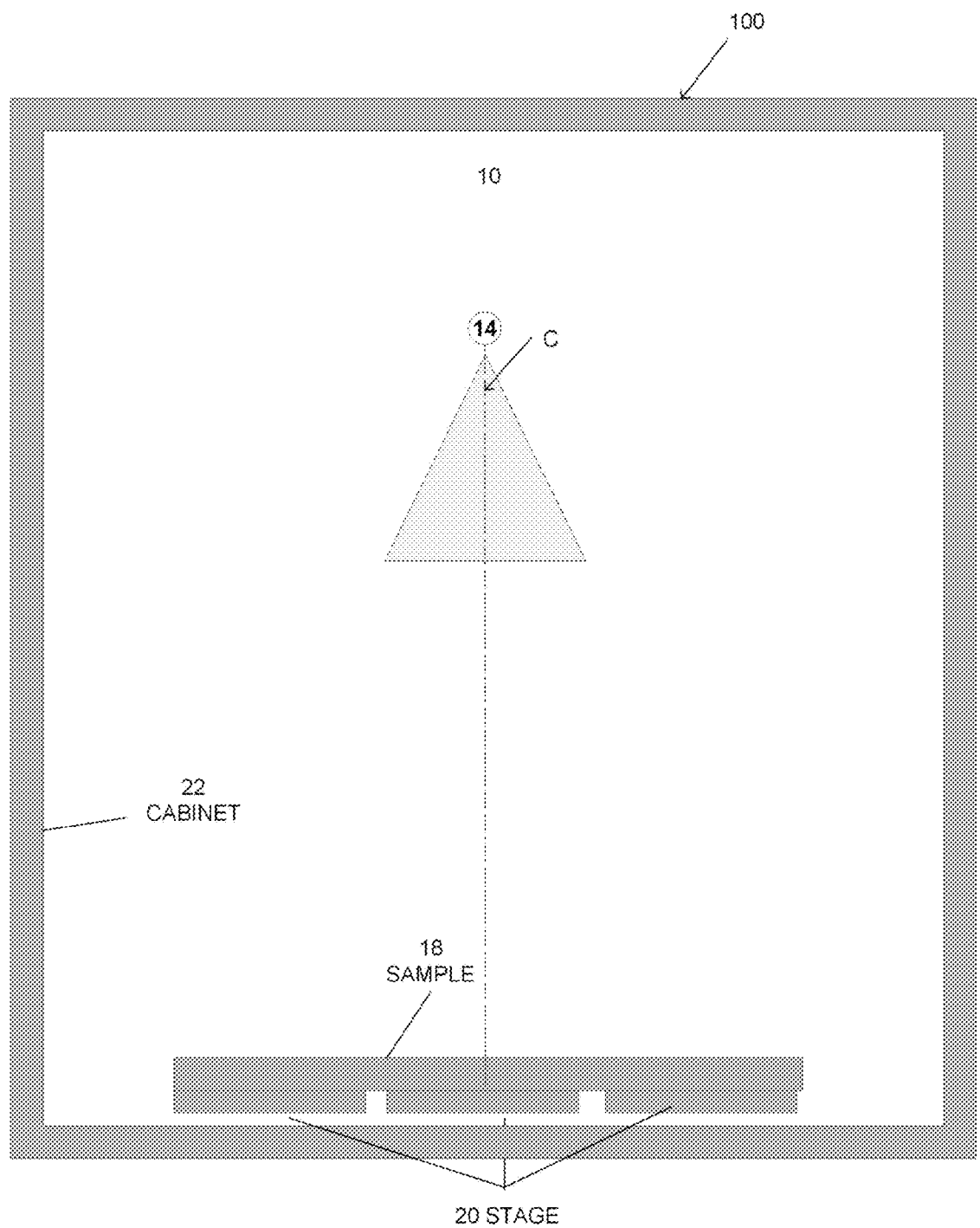
FIG. 1 is one example embodiment of the aspects of the disclosed embodiments.
Figure 2:
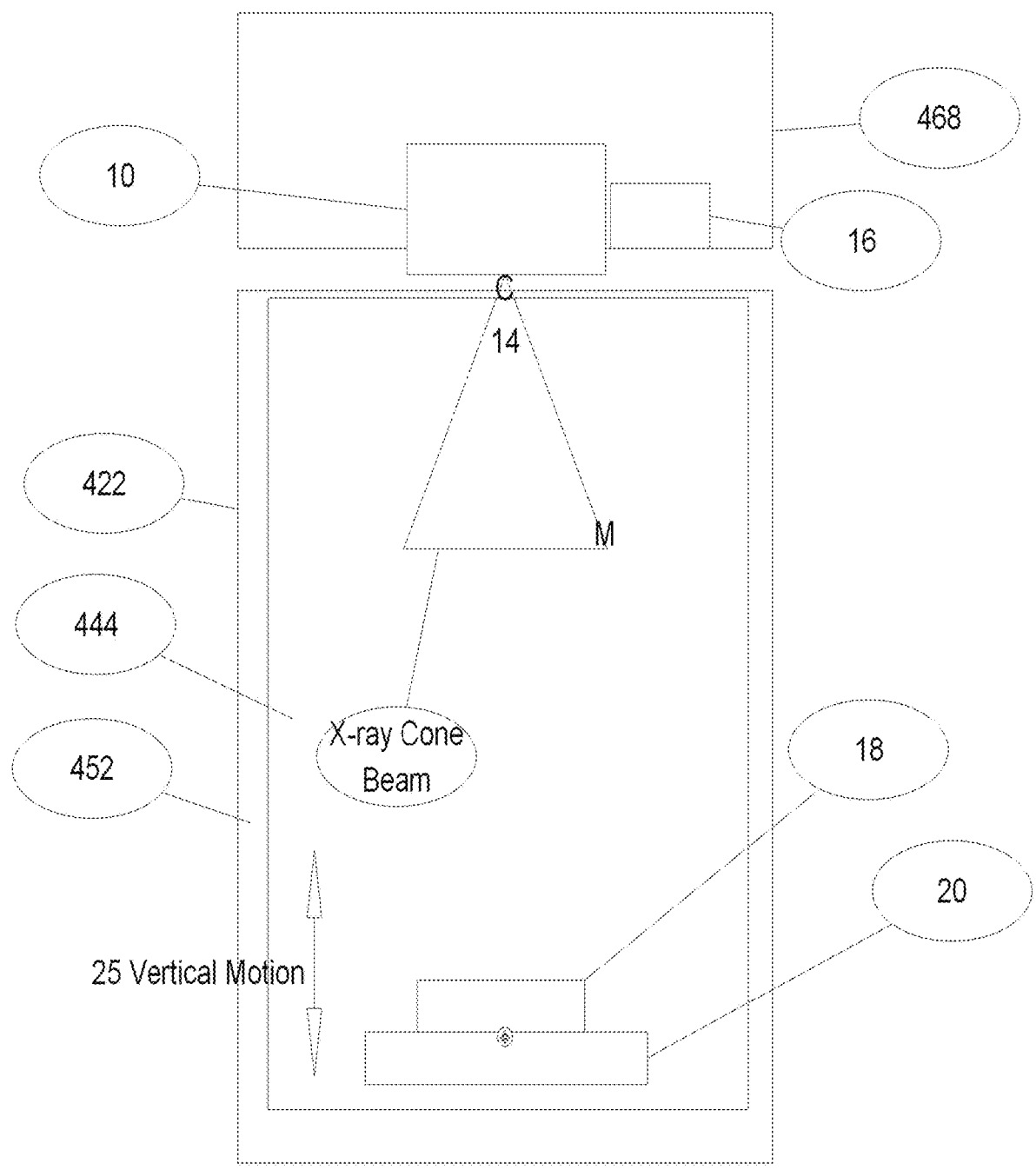
FIG. 2 illustrates the sample chamber of an exemplary embodiment of the present disclosure.
Figure 3:
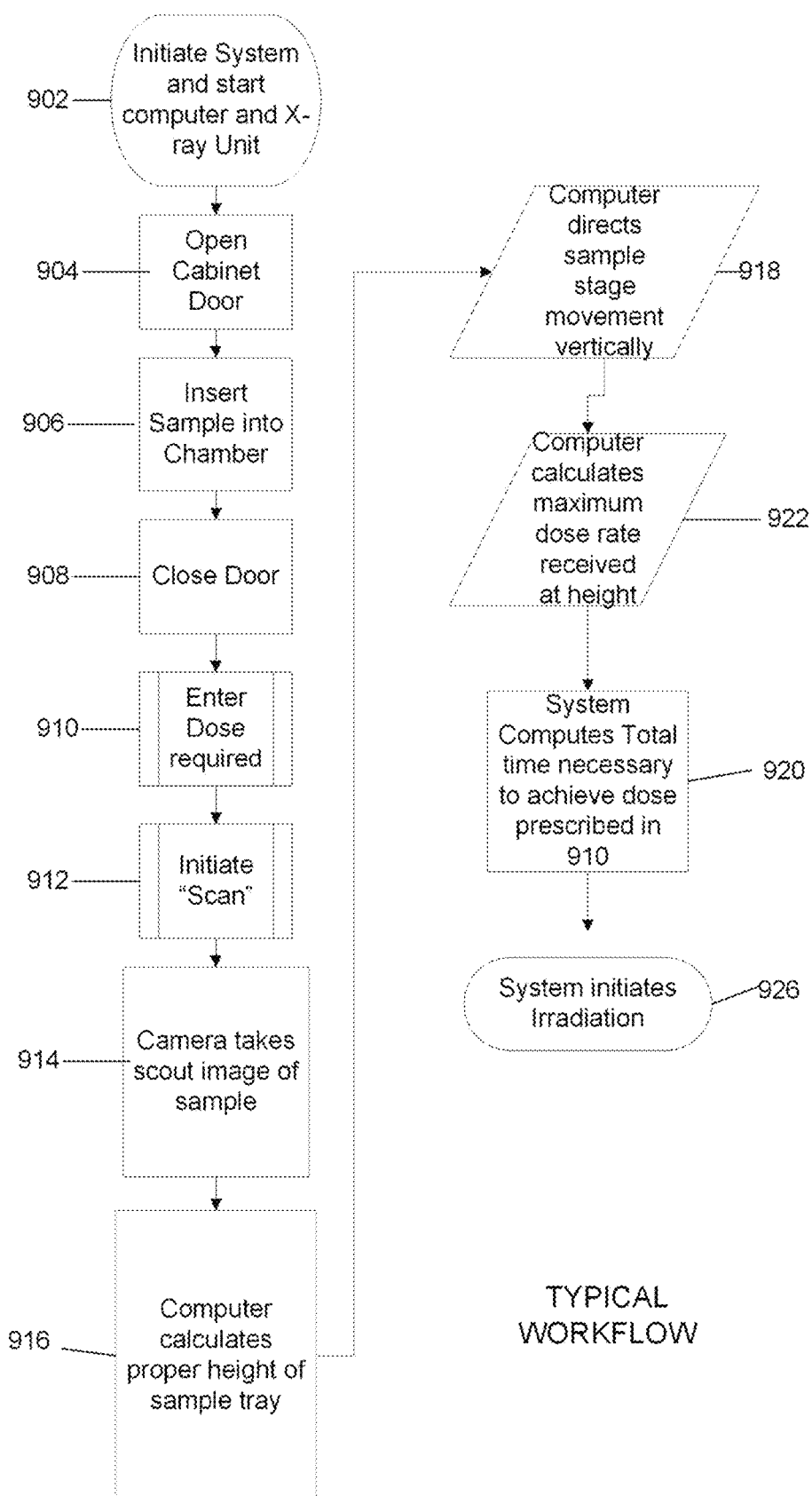
FIG. 3 illustrates the basic workflow of the one example embodiment of the present disclosure.

Reference will now be made to figures wherein like structures will be provided with like reference designations. It is understood that the drawings are diagrammatic and schematic representations of exemplary embodiments of the invention, and are not limiting of the present invention nor are they necessarily drawn to scale. FIGS. 1-3 depict various features of embodiments of the present invention, which embodiments are generally directed to a system that can utilize a real-time camera to capture an image of the sample.

Referring first to FIG. 1, there is shown an example of the embodiment of a camera incorporated into a Cabinet Irradiator Unit. The professional or other authorized operator places a specimen/sample into the chamber on the sample tray, closes and secures the door, inputs the desired total dose, and presses irradiate on the computer screen. Simultaneously the computer commands the camera to capture image of the sample located on the sample tray, does a look-up for maximum coverage and commands the sample tray stage to move vertically up from the cabinet floor moving the sample closer to the x-ray source and in turn commands the x-ray beam to initiate and sets the timer on the computer program to deliver the dose desired which provides more flexibility for a clinician or other user of the system and simplifies the procedure. Manual input for operation of the cabinet irradiator unit may be initiated via keyboard and configured in accordance with one example embodiment of the present invention.

Figure 4:
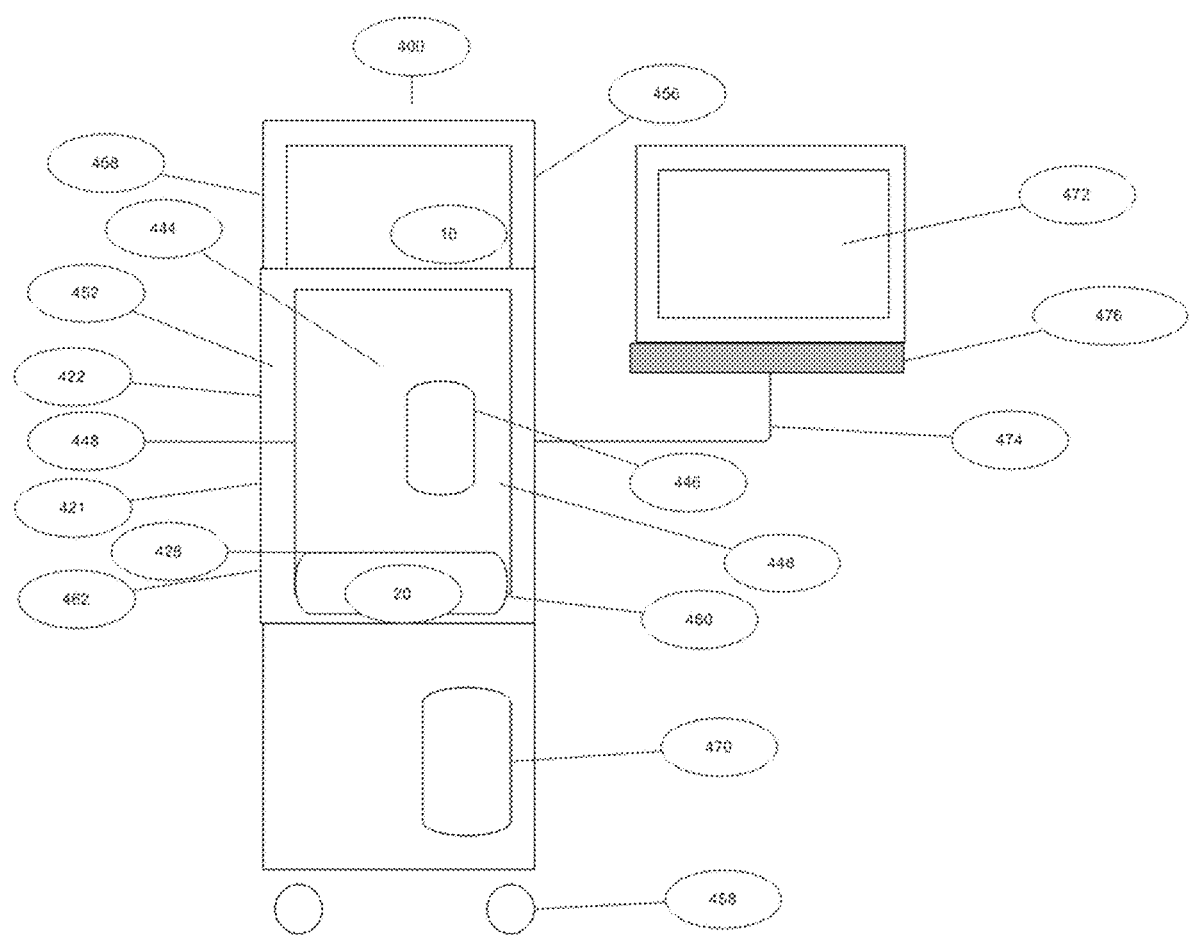
FIG. 4 illustrates an example of a Cabinet Irradiator System incorporating aspects of the present disclosure.
Figure 5:
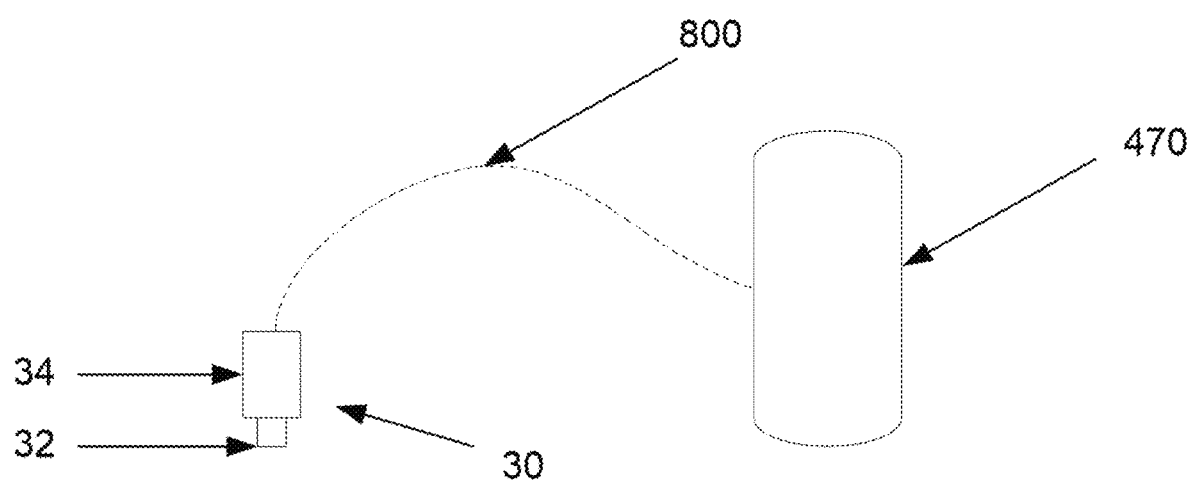
FIG. 5 is one example of the HD camera that may be utilized in the aspects of the disclosed embodiments.

FIG. 2 displays the front view into the cabinet irradiator unit. FIG. 3 displays the basic workflow of the cabinet irradiator unit. FIG. 4 displays the basic components of the cabinet irradiator unit. FIG. 5 displays a basic camera unit.

Indeed, it is appreciated that the system and its individual components can include additional features and components, though not disclosed herein, while still preserving the principles of the present invention. Note also that the base computer can be one of any number devices, including a desktop or laptop computer, etc.

The aspects of the disclosed embodiments may be embodied in other specific forms without departing from its spirit or essential characteristics. The described embodiments are to be considered in all respects only as illustrative, not restrictive. All changes that come within the meaning and range of equivalency of the claims are to be embraced within their scope.

What is claimed is:

1. A cabinet irradiator system incorporating a real-time camera, comprising:
    a base unit including an image processor and a display;
    the base unit incorporating a computing device;
    an imaging chain incorporated into the base unit, including:
        an x-ray source;
        a real-time camera;
        a system configured to receive video data; and
        an interface for enabling an analog/digital signal to be transferred from the image capture apparatus to the computer of the base unit;
    the cabinet irradiator system further comprising a moveable sample stage;
    wherein the real-time camera is configured to capture a real-time image of a sample and the computing device is configured to move the moveable sample stage vertically to attain a closer proximity to an output window of the x-ray source to maximize a dosage received by the sample in a shortest duration of time and operating the system to allow the sample to attain a desired prescribed dose.

2. The system according to claim 1, in which the system is configured to supply standard or High-Definition (HD) real-time images.

3. The system according to claim 1, in which the camera is mounted onto the system whereas to integrate an exact capture/orientation image of a sample being irradiated.

4. The system according to claim 1, comprising a mechanical system to move a sample tray enclosed in the cabinet irradiator system in a vertical motion.

5. The system according to claim 1, wherein the base unit is enclosed in the cabinet irradiator system.

6. The system according to claim 1, wherein the base unit is utilized for any organic or inorganic specimen that fits inside the cabinet irradiator system.

7. The computing device of claim 1, comprising:
    at least one processor, and
    at least one module configured by the at least one processor to:
        output, for display:
            a display action determined based on the video data; and
        responsive to determining the display action, output for display a resultant image attained by the cabinet irradiator system.

8. The computing device of claim 7, wherein the processor is configured to signal a mechanical system to move a sample tray enclosed in the cabinet irradiator system in a vertical motion.

9. The computing device according to claim 8, wherein the processor is coupled to a computational system configured to move the sample tray enclosed in the cabinet irradiator system in a vertical motion proximate the x-ray source to ensure maximum coverage.

10. The computing device according to claim 7, comprising a computational system configured to:
    calculate a time needed to provide a desired/prescribed total radiation dose at a vertical height and dose rate; and
    command the system to provide the total radiation dose.

11. A cabinet irradiator system comprising:
    an x-ray tube with an output window;
    a moveable sample stage including a sample chamber floor;
    a dosimeter; a real-time camera; and
    a computing device, wherein the computing device is configured to receive video data from the real-time camera and based on the video data manipulate the moveable sample stage height vertically in relationship to the sample chamber floor to position the output window of the x-ray tube to be able to deliver a maximum dose rate to a sample in the moveable sample stage.

* * * * *